P. E. NORRIS.
SEALING STRUCTURE FOR STORAGE BATTERY TERMINAL POSTS.
APPLICATION FILED MAR. 9, 1921.
1,419,511.   Patented June 13, 1922.
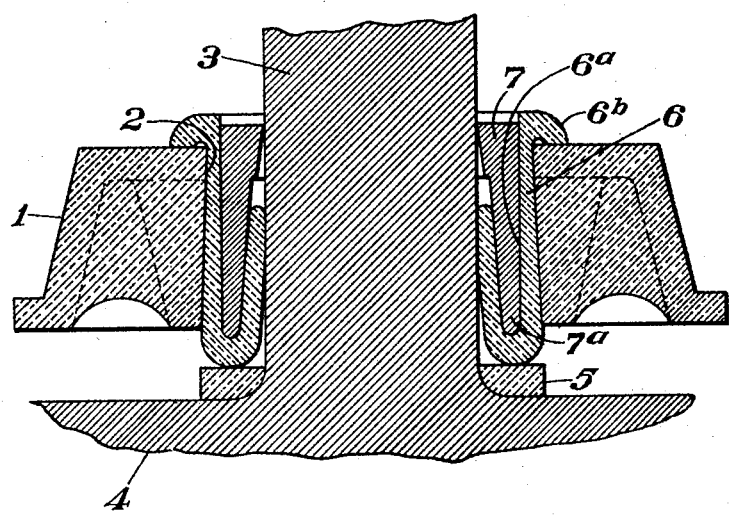
Paul E. Norris, INVENTOR.
BY
A. L. Verrill, ATTORNEY.

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

SEALING STRUCTURE FOR STORAGE-BATTERY TERMINAL POSTS.

1,419,511.  Specification of Letters Patent.  Patented June 13, 1922.

Application filed March 9, 1921. Serial No 450,987.

*To all whom it may concern:*

Be it known that I, PAUL E. NORRIS, a citizen of the United States, residing at Wilkinsburg, in the county of Allegheny and State of Pennsylvania, have invented certain new and useful Improvements in Sealing Structures for Storage-Battery Terminal Posts, of which the following is a specification.

My invention relates to electric batteries, and particularly to means for sealing the space between the battery cell and the terminal post to prevent loss of battery liquid through such space. My invention is particularly well adapted to secondary or storage batteries, although it is not limited to batteries of this class.

I will describe one form of structure embodying my invention, and will then point out the novel features thereof in claims.

The accompanying drawing is a view showing in vertical section one form of sealing structure embodying my invention.

Referring to the drawing, the reference character 1 designates the cover of a storage battery cell, which cover is provided with a round hole 2. Projecting through the hole 2 is a terminal post 3 which is integral with a connecting strap 4 to which all the plates of one polarity are attached.

Interposed between the post 3 and the cover 1 is a sleeve-like gasket 6 of soft rubber or other similar material, the lower end of which rests on an annular gasket 5 likewise of soft rubber or the like located on the top of the connecting strap 4. Gasket 6 is provided with a circular recess $6^a$ which extends from the upper end well down into the gasket, and the cross section of which at any point is in the shape of a V. The reference character 7 designates a follower or packing sleeve of lead or other suitable material which is sleeved over the post 3, and the lower portion of which constitutes a circular wedge-shaped projection $7^a$ adapted to enter the recess $6^a$ in gasket 6. It will be seen that by driving the follower 7 down on post 3, the gasket 6 will be forced against the post and the wall of hole 2 with considerable pressure, thereby forming a structure through which the liquid in the battery cannot escape, and yet the post and cell cover are not rigidly connected so that there is little or no danger of breakage of any part due to shocks. It should be noted in particular that a certain amount of vertical movement of the post with relation to the cover may occur without straining any of the parts, and so the post is free to move downwardly from its original position as the plates settle while the battery is in service.

The upper end of the gasket 6 is provided with an outwardly extending flange $6^b$ which rests on the top of the cell cover 1. This flange has several advantages among which are the following. It causes the gasket to retain the proper shape. It prevents any tendency of the gasket to pull through the cover or to slip down in the cover as the post moves downwardly due to the settling of the plates into their permanent location. It causes the top of the battery to have a finished appearance.

Although I have herein shown and described only one form of sealing structure embodying my invention, it is understood that various changes and modifications may be made therein within the scope of the appended claims without departing from the spirit and scope of my invention.

Having thus described my invention, what I claim is:

1. In an electric battery, a cell cover provided with a hole, a terminal post projecting through said hole, a gasket sleeved on said post and having a flange at the top resting on the upper surface of said cell cover, said gasket also having a circular V-shaped recess extending downwardly from the top, and a follower provided with a circular wedge-shaped projection adapted to enter the recess in said gasket to spread the gasket against the post and the wall of the cell cover hole.

2. In an electric battery, a cell cover provided with a hole, a terminal post projecting through said hole, a gasket sleeved on said post and having a flange at the top resting on the upper surface of said cell cover, and a follower for spreading said gasket against the post and the wall of the cell cover hole.

3. In an electric battery, a cell cover provided with a hole, a terminal post projecting through said hole, a gasket sleeved on said post and having a flange at the top resting on the upper surface of said cell cover, and means for forcing said gasket against the post and the wall of said cell cover hole.

4. In an electric battery, a cell cover provided with a hole, a terminal post projecting through said hole, a gasket sleeved on said post, and a follower for spreading said gasket against the post and the wall of said hole, the upper rim of said gasket having an outwardly projecting flange which rests on the top of said cell cover outside of said follower.

In testimony whereof I affix my signature.

PAUL E. NORRIS.